April 4, 1950 C. E. FIKE 2,502,562
PLUG-TYPE FISHING LURE
Filed Feb. 21, 1947
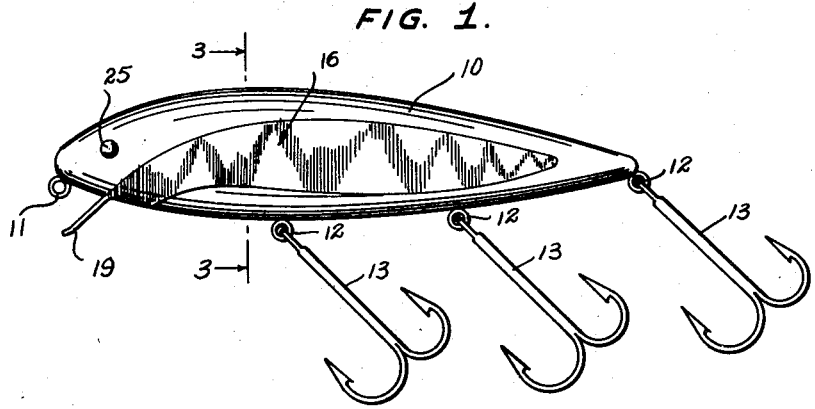
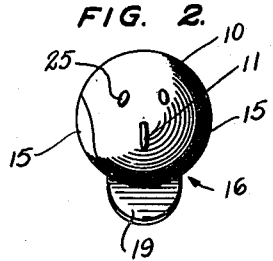
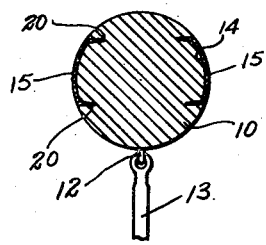
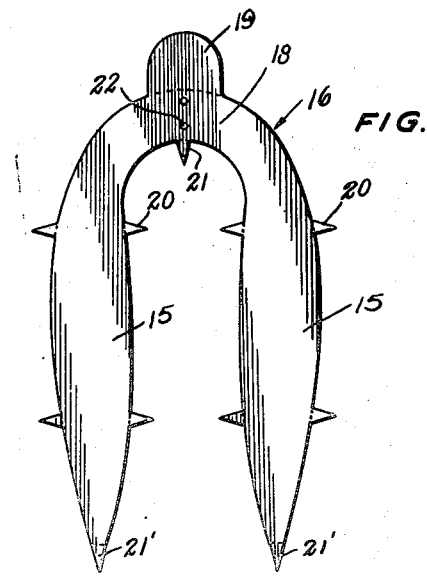
INVENTOR.
CLAUDIUS E. FIKE,
BY
*McMorrow, Berman & Davidson*
ATTORNEYS.

Patented Apr. 4, 1950

2,502,562

UNITED STATES PATENT OFFICE 2,502,562

PLUG-TYPE FISHING LURE

Claudius E. Fike, Ahoskie, N. C.

Application February 21, 1947, Serial No. 729,936

2 Claims. (Cl. 43—42.32)

This invention relates to a plug-type fishing lure, and has for its primary object the provision of such a lure characterized by the inherent stability and ease of casting of a plug-type lure combined with the attractiveness, for certain types of game fish, of a spoon-type lure.

A further object of the invention is the provision of a lure of the plug type provided with longitudinally extending bands of flashing material in simulation of the silver sides of the silver-side type of minnow.

An additional object of the invention is the provision of such a lure having a depending portion extending transversely across the body thereof characterized by a spoon shape and adapted to reflect light therefrom in a manner similar to that of the spoon-type lure.

Still another object of the invention is the provision of an attachment for a plug-type bait comprising two connected annular strips of silver-like material, such, for example, as chrome plated metal, connected at their extremities and provided with means integral therewith forming a dependent spoon portion, which may be readily attached to a plug-type lure.

A further general object of the invention is the provision of an improved lure which may be readily cast, and yet which will at the same time be highly attractive to a relatively wide variety of game fish.

Other objects will in part be obvious and in part be pointed out as the description of the invention proceeds, and shown in the accompanying drawings, wherein there is disclosed a preferred embodiment of this inventive concept.

In the drawings:

Figure 1 is a side elevational view of one form of lure embodying features of the instant invention.

Figure 2 is an end or front elevational view of the device of Figure 1, as viewed from the left.

Figure 3 is a sectional view taken substantially along the line 3—3 of Figure 1, as viewed in the direction indicated by the arrows.

Figure 4 is a plan view of the metallic portion of the device prior to its association with the plug.

Similar reference characters refer to similar parts throughout the several views of the drawings.

Referring now particularly to Figure 1, the device of the instant invention comprises a plug body 10 of substantially conventional form and of any desired material, such as wood or the like. The body 10 is provided adjacent its forward extremity with an eye 11 to which is adapted to be secured a leader or a fishing line as may be desired, and carries along its under side a plurality of additional eyes 12 of any desired number, to which may be secured conventional hooks 13 of either the single, double, or triple type, as desired. Obviously, the arrangement and form of the hooks may suit a variety of conditions.

The plug body 10 has, as best shown in Figure 3, longitudinally extending cut-out portions 14 adapted for the reception of the side members 15 of a metallic member, generally indicated at 16, and to be more fully described hereinafter.

The metallic member 16, which is preferably of any highly reflective material, such as heavy silver foil, chromium coated aluminum, or similar sheet material, is, prior to its application to the plug body of the general configuration shown in Figure 4, or substantially U-shape, including the side portions 15, and a connecting portion 18, from which connecting portions extends a projection 19. Any desired number of tangs 20 may be provided at suitable portions along the sides 15, as may a tang 21 at the inner extremity of the connecting portion 18, while the tips of the sides 15 may terminate in relatively sharp pointed extremities 21' which may be inturned to form additional tangs if desired. Holes 22 may be provided, if desired, in the central part of connecting portion 18.

Obviously, the member 16 may be formed from a single sheet of material in a single stamping, if desired.

In the assembly of the device, the tangs 20, 21 and 21' may be bent at substantially right angles to the body portion, as indicated in Figure 3. The member 16 is then positioned, as shown in Figure 1, in the grooves 14 extending longitudinally of the plug body 10, and the tangs forced inwardly into the body. The projecting portion 19 is bent outwardly in the opposite direction from the bending of the tangs in such manner as to depend, as best shown in Figures 1 and 2, and form a spoon-like member directly beneath the forward extremity of the device. Suitable nails or pins may be passed through the apertures 22, if desired, to further secure the metal portion 16 to the body.

If desired, additional highly reflective metal portions, as, for example, eye portions 25, may be provided, either as indicated, or dispersed at suitable points throughout the plug body to further enhance the reflective appearance thereof.

From the foregoing it will now be seen that there is herein provided an improved fish lure characterized by a plug-type body and presenting a substantially flush surface, but which provides the attractiveness of highly reflective sides, combined with a depending portion 19, which acts as a spoon, to impart a relatively wobbling motion to the device to stimulate the movements of an actual silver-sided minnow, thus providing the attractiveness of the spoon-type lure with the inherent stability and ease of casting of a plug.

Obviously, if desired, the plug may be made of any desired size and in a plurality of forms or shapes.

It will also be seen that there is herein provided a device which accomplishes all the objects of this invention, and others, including many advantages of great practical utility.

As many embodiments may be made of this inventive concept, and as many modifications may be made in the embodiment hereinbefore shown and described, it is to be understood that all matter herein is to be interpreted merely as illustrative and not in a limiting sense.

I claim:

1. In a fish lure, an elongated body portion which is substantially circular in transverse cross section and tapered toward its opposite ends, the body portion being provided in its outer surface with a single continuous shallow groove, said groove including elongated portions in the opposite sides of the body portion which extend substantially the full length of the body portion and a forward generally U-shaped transverse portion in the bottom of the body portion which communicates with the elongated portions of the groove, and a unitary thin strip of light reflecting material mounted within the groove which conforms to the shape of the groove and is flush with the outer surface of the body portion, the unitary thin strip including a depending integral deflecting plate at its forward edge which extends below the forward end of the body portion.

2. In a fish lure, an elongated body portion, the body portion being provided in its outer surface with a single continuous shallow groove, said groove including elongated portions in the opposite sides of the body portion which extend for substantially the full length of the body portion and a forward generally U-shaped transverse portion in the bottom of the body portion which communicates with the elongated portions of the groove, and a unitary thin strip of light reflecting material mounted within the groove which conforms to the shape of the groove and is flush with the outer surface of the body portion, the unitary thin strip including a depending integral inclined deflecting plate at the forward edge of the strip and a plurality of integral pointed tangs arranged in spaced relation about the marginal edge of the strip and bent inwardly generally at right angles to the strip for insertion into the body portion, the tangs serving to secure the strip to the body portion.

CLAUDIUS E. FIKE.

REFERENCES CITED

The following references are of record in the file of this patent:

UNITED STATES PATENTS

| Number | Name | Date |
| --- | --- | --- |
| 1,445,916 | Smith | Feb. 20, 1923 |
| 1,898,740 | Novitzky | Feb. 21, 1933 |
| 2,036,075 | Peterson | Mar. 31, 1936 |
| 2,242,726 | Leusch | May 20, 1941 |